3,198,863
PROCESS OF CURING URETHANE THREADS UTILIZING SLOW AND FAST CURING AGENTS
Robert E. Lauer, Groveville, and George C. McCormick, Burlington, N.J., assignors to Thiokol Chemical Corporation, Bristol, Pa., a corporation of Delaware
No Drawing. Filed May 2, 1963, Ser. No. 277,439
12 Claims. (Cl. 264—184)

This invention relates to a novel wet-spinning extrusion process for the preparation of urethane thread.

Urethane thread is commonly made by extruding urethane polymers or prepolymers in fluid form through a spinning head under such conditions that the resulting filamentary material is converted to solid, usually elastomeric, form. In general most of the known methods of producing urethane thread may be roughly divided into three categories which may be characterized as the melt-spinning, solvent-spinning, and wet-spinning processes. In the melt-spinning process a polymer in molten form is extruded through a spinning head and the resulting filaments are converted to solid form by cooling. Representative patents disclosing such melt-spinning processes include U.S. 2,929,801; 2,929,802; 2,929,804; 3,023,-192; 3,038,884; 3,044,987; 3,044,989; and 3,053,611.

The melt-spinning process requires the use of fully reacted polymers having unusually high heat stability. The requirement for heat stability of the polymer severely limits the types of polymers that can be used to produce thread and also limits the properties of the thread produced therefrom. Moreover, in preparing thread by the melt extrusion process, a very close control of temperature must be maintained in order to ensure success of the process. Such close temperature control is often difficult to attain at the relatively high temperatures that must be used with this process.

In a typical solvent-spinning process, the urethane polymer or prepolymer is dissolved in a suitable solvent and extruded through the spinning head into a coagulating bath to produce the solid filaments or threads. Representative patents showing the solvent-spinning process include 2,708,617; 2,755,266; 2,923,598; 2,957,852; 2,962,470; 2,973,333; 3,036,878; 3,044,987; 3,044,990; 3,047,356; 3,047,909; Re. 24,689; and Re. 24,691. The properties of the thread that can be prepared by this process are limited at the outset by the fact that only solvent-soluble polymers or prepolymers can be used therein. Also the removal of the solvent from the system during and after formation of the thread is expensive and can be technologically difficult. Moreover, unless the removal of the solvent from the thread is complete, the thread will have inferior properties.

In the wet-spinning process for making urethane thread, a liquid urethane prepolymer is extruded through a spinning head into a bath containing or consisting of a complementarily reactive material to form the thread. For example, the liquid prepolymer may be extruded into a bath comprising an aqueous solution of a curing agent capable of converting the prepolymer into an elastomer. Representative patents disclosing the wet-spinning process include 2,708,617; 2,953,839; 3,009,762; 3,009,764; and 3,009,765.

One serious limitation that has been encountered in the wet-spinning process arises out of the fact that the curing agent employed must react rapidly with the extruded prepolymer in order to avoid undesired distortion of the filaments after extrusion. Since there are relatively few such fast-acting curing agents, it has not been possible to produce urethane thread by the wet-spinning process with a very wide variety of properties. To some extent a variation in the properties of the urethane thread can be achieved by modification of the basic structure or backbone of the urethane prepolymer and tailoring it to meet the curing rate requirements of the relatively few fast-curing agents that can be employed in this process. However, such changes in the backbone of the prepolymer are often expensive and difficult to make.

In several of the prior art wet-spinning processes curing of the core of the thread is carried out by treatment with water under pressure. Such a water cure again limits the range of properties that can be obtained in the finished thread and also leads to the formation of carbon dioxide bubbles which may weaken the thread. Moreover, pressure curing is an expensive and technologically difficult process to carry out.

The present invention is particularly concerned with an improvement in wet-spinning processes of the general type outlined above. It is an object of the invention to provide a novel and improved wet-spinning extrusion process for producing urethane thread. It is another object of the invention to provide an extrusion process for preparing urethane thread which permits the use of a wide variety of curing agents to produce threads having a wide variety of properties from a given urethane prepolymer. It is a further object of the invention to provide an extruded urethane thread process which permits a relatively wide variation in reaction conditions and reactant concentrations to obtain a wide range of thread properties. It is a still further object of the invention to provide an extruded urethane thread process which is simpler and more effective than those previously available. Other objects of the invention will be in part obvious and in part pointed out hereafter.

The present invention is based on the discovery that the objects and advantages outlined above can be achieved in general by using a combination of a relatively fast and relatively slow curing agent. In accordance with a preferred embodiment of the invention, an isocyanate-terminated urethane prepolymer of a type that is known to be useful in thread making is first blended or mixed with a relatively slow-acting curing agent in such manner and under such conditions that the prepolymer and curing agent react only relatively slowly. The resulting blend of prepolymer and slow curing agent is then extruded through a spinning head into a surface setting bath containing a fast-reacting curing agent under such conditions that the fast curing agent cures the surface of the extruded filament to form an outer solid layer surrounding an incompletely reacted core. The thread as thus formed is then removed from the surface set bath and heated for an extended period of time to cause the slow-reacting curing agent to cure the core of the thread. By using the set bath containing the fast-reacting curing agent, a protective surface coating is rapidly formed on the extruded filament, and hence it becomes practical to use a wide variety of the slow-reacting curing agents to achieve threads with a wide range of different desired properties.

In general any of the urethane prepolymers that are known to be useful in thread making may be employed in the process of the present invention. A great many such prepolymers are known in the art. One extensive class of such prepolymers comprises the isocyanate-terminated polyesters. Such prepolymers may be made by condensing a polyhydric alcohol with a polycarboxylic acid to form a linear polyester which is then reacted with a slight molar excess of a polyisocyanate to provide an essentially linear isocyanated-terminated product having an average molecular weight within the range 1000 to 7000. Polyhydric alcohols that can be used in preparing such prepolymers include the polyalkylene glycols such as ethylene, propylene and butylene glycol, as well as diethylene and dipropylene glycols and polymethylene glycols such as tetramethylene and hexamethylene glycols. Sometimes small amounts of alcohols having more than two hydroxyl groups such as trimethylol propane or pentaerythritrol are included to provide a small degree of crosslinking. Polycarboxylic acids that may be condensed with the polyhydric alcohol to form linear polyesters include oxalic, adipic, sebacic, malonic, succinic, maleic, fumaric, dimer, and itaconic acids. The proportions of alcohol and acid used are desirably adjusted to provide a linear polyester having hydroxyl terminals.

Linear polyesters as thus prepared may be reacted with a slight excess say 1% to 5% molar excess, of any of a large number of polyisocyanates to form a liquid urethane prepolymer. Among the useful polyisocyanates are aliphatic, aromatic or aliphatic-aromatic isocyanates such as butylene diisocyanate; ethylidine diisocyanate; ethylene diisocyanate; propylene-1,2-diisocyanate; tetramethylene diisocyanate; hexamethylene diisocyanate; propylene-1,2-diisocyanate; 4,4'-diphenyl diisocyanate; 4,4'-diphenylene methane diisocyanate; dianisidine diisocyanate; 1,4- and 1,5-naphthalene diisocyanate; 4,4'-diphenyl ether diisocyanate; m- and p-phenylene diisocyanate; 4,4' toluidene diisocyanate; 1,4-xylylene diisocyanate; phenylethylene diisocyanate; the 2,4-; 2,5-; and 2,6-; 3,5-toluene diisocyanates; 1,3-cyclopentylene diisocyanate; 1,2-cyclohexylene diisocyanate; 1,4-cyclohexylene diisocyanate; 1,4-cyclohexane diisocyanate; chloro diphenyl diisocyanate; 4,4',4''-triphenyl methane triisocyanate; 1,3,5-triisocyanato benzene; 2,4,6 - triisocyanato benzene and 4,4' - dimethyl-diphenyl methane-2,2',5,5' tetraisocyanate.

Another class of urethane prepolymers that have been used for thread making comprises the isocyanate-terminated polyethers. These products can be made by reacting, for example, polyalkylene glycols such as polyethylene and polypropylene glycols with diisocyanates of the type listed above. In addition isocyanate-terminated polythioethers and polythioesters, as well as materials having a hydrocarbon backbone may be used. Numerous other species of suitable prepolymers are disclosed in the patents listed above. In general the above-described prepolymers are generically referred to herein for convenience as thread-making urethane prepolymers. The prepolymer can be a liquid at room temperature or a low melting point solid. Also combinations of two or more prepolymers may be used to modify the properties of the thread as desired.

As indicated above, the thread-making urethane prepolymer is mixed with a slow-reacting curing agent which is desirably a polyfunctional, non-aqueous, active hydrogen-containing, material. Polyols, polyol-substituted amines, and aromatic amines may be used for this purpose. Representative compounds falling within these categories are ethylene glycol; propylene glycol; trimethylolpropane and polyethers based on trimethylolpropane, 1,3,6-hexanetriol; triethanolamine; 3-amino cyclo-hexanol; p-amino phenylethylalcohol; p,p'-diamino-diphenylmethane; benzidine o-dichlorobenzidine; 3,3'-dichloro benzidine; triisopropanolamine; ricinoleyl alcohol; castor oil and its derivatives; methyl diethanolamine; low molecular weight polyether glycols; methylene-bis-orthochloraniline; N,N,N',N'-tetrakis(2 - hydroxypropyl) ethylene diamine; ethanolamine; diethanolamine; phenyl diethanolamine; trialkylamines such as triethylamine; and dimethyl aniline. The preferred slow reacting curing agents are trimethylolpropane; triisopropanolamine and N,N,N',N'-tetrakis(2-hydroxy-propyl) ethylene diamine. These slow-reacting curing agents may be used alone or in combination with one another.

The prepolymer and slow-acting curing agent are desirably so blended as to provide a molar ratio of isocyanate groups to active hydrogen in the range of about 0.8:1 to 2.0:1, preferably about 1.2:1. If the prepolymer and/or slow-acting reagent are solids at room temperature, they should be melted so that the two materials can be readily blended homogeneously. If the prepolymer and slow-reacting curing agent are immiscible, they may be dissolved in a common non-volatile solvent to form a liquid mixture which is suitable for extrusion purposes. The blended prepolymer and slow-curing agent may be degassed before the extrusion step in order to remove any dissolved gases that may be present in the blend.

The blend of prepolymer and slow-acting curing agent is extruded through a conventional spinning head into a surface set bath which in a preferred embodiment of the invention is an aqueous solution containing from 1 to 5% by weight, preferably about 2.5% of a fast-reacting curing agent. The fast curing agents useful in the present process are amines that have at least two primary amino groups and are soluble in water to the extent of at least 5% by weight. Representative amines falling within this category are ethylene diamine, propylene diamine, hexamethylene diamine, diethylene triamine, triethylene tetramine, butylene diamine, pentamethylene diamine, N,N'-diisobutyl hexamethylene diamine and tetraethylene pentamine. The preferred fast-reacting curing agents are the aliphatic diprimary such as ethylene diamine, propylene diamine, and hexamethylene diamine. Such fast-reacting curing agents react rapidly with the prepolymer at the outer surface of the filament after extrusion and form an outer shell or layer which prevents deformation of the extruding filament, even though the core, comprising a blend of prepolymer and slow curing agent, may still be in a fluid or plastic state.

The set bath may also contain from 0.25 to 1.0% by weight of conventional wetting agents such as the sodium salts of long-chain fatty acids to promote wetting of the thread when it enters the set bath. Representative wetting agents of this type are sold under the trade designations Triton X–100 and Duponol ME. Numerous other equivalent wetting agents are known to those skilled in the art.

The set bath is desirably maintained at a temperature of 80° to 200° F. depending on the reactivity of the reactants used. The thread forms faster at higher temperatures and vice versa. Practical times of immersion in the set bath depend upon the temperature and concentration of the bath and the type of fast curing agent used therein, and usually falls in the range of 1 to 60 seconds. After this period the thread is removed from the set bath and may be rinsed if desired before final curing.

Upon removal from the set bath, the thread is passed through a circulating air oven in which the temperature is maintained at say 250° to 350° F. for a period of say 0.5 to 3 hours. The preferred temperature is 275° to 300° F. During this heating step the prepolymer and slow-reacting curing agent in the core of the thread react to complete the curing of the thread. Passage of the thread through the surface set bath and the curing oven can be conducted in either a continuous or batch manner. The urethane thread is desirably allowed to postcure at room temperature for about a week.

The properties of the thread thus formed are imparted to it for the most part by the blend of prepolymer and slow-reacting curing agent which form the core of the thread. The amount and type of fast-reacting curing agent used to form the outside layer on the thread in the set bath do not materially influence the properties of the resulting thread. Since the reaction rate of the slow-reacting curing agent is essentially noncritical in the present process, it is possible to use a wide variety of such slow curing agents to prepare urethane thread from a wide variety of prepolymer types. The prepolymers which may be employed in the present process are not limited to those having particular solubility or melting point properties as they are in the melt-spinning and solvent-spinning processes referred to above; in the present process the properties of the thread prepared from a single type of prepolymer can be readily changed over a wide area by selecting the proper slow-reacting curing agent.

In order to point out more fully the nature of the present invention, a number of specific examples are given below of illustrative embodiments of the process of the invention and the properties of the threads produced thereby. In the examples reference is made to various prepolymers and curing agents which may be defined as follows:

PREPOLYMERS

*P-1.*—This prepolymer is obtained by condensing a blend of 4 parts by weight of ethylene glycol and one part by weight of propylene glycol with adipic acid, using a slight excess of the glycol blend to produce a hydroxyl-terminated linear polyester having a molecular weight of 4000 to 5000. The polyester is then reacted with a 3% molar excess of a mixture of 2,4- and 2,6- toluene diisocyanate to provide isocyanato terminals on the ends of the polyester chains.

*P-2.*—This prepolymer is a commercial product sold under the trade designation "Adiprene L." It is believed to be the reaction product of a tetramethylene ether glycol and a diisocyanate. It has a molecular weight of about 4000 and an isocyanate content of about 4%.

*P-3.*—A mixture of approximately equal parts of 1,4-butane diol and 1,2-butane diol is condensed with adipic acid to form a hydroxyl-terminated linear polyester. This polyester is reacted with a 3% molar excess of toluene diisocyanate to provide isocyanato terminals on the polyester molecules.

*P-4.*—This prepolymer is the same as P-1, except that the ethylene glycol-propylene glycol ration is 9:1 instead of 4:1.

SLOW CURING AGENTS

*SC-1.*—This curing agent is a hexafunctional polyether glycol based on sorbitol. It is a commercial product sold under the trade designation "G-2408" and having a molecular weight of about 2400.

*SC-2.*—A phenyl diethanolamine.

*SC-3.*—This is a commercial product sold under the trade designation "Flexiricin 13." It is believed to comprise by weight about 50% glycerol monoricinoleate, 40% glycerol diricinoleate and 10% glycerol triricinoleate.

*SC-4.*—4,4'-methylene-bis (orthochloroaniline).

*SC-5.*—A mixture of trimethylol propane and triisopropanolamine in a 3:1 ration by weight.

The threads made by the procedures described in the examples given below were tested to determine a number of their physical properties, and the results are tabulated in the examples. The properties referred to in the tables of the examples are as follows:

*Tensile.*—The values given are the ultimate tensile strength of the thread in pounds per square inch.

*Elongation.*—The values given are for the ultimate elongation of the thread measured as a percentage of its unstressed length.

*Modulus.*—These values are the elastic modulus in pounds per square inch measured at various percentage elongations as indicated in the tables.

*Permanent set.*—These values were determined by stretching the thread to 75% of its ultimate elongation for 10 minutes, then releasing the thread for 10 minutes, and thereafter measuring the elongation in percent.

*Tension set.*—In measuring this value the thread was stretched to 80% of its ultimate elongation eight times with intervening relaxation. After a 1-minute relaxation period following the eighth stretch, the permanent elongation was then measured as a percentage of the original length of the thread.

In the following examples proportions are given in parts by weight unless otherwise indicated.

EXAMPLE 1

Three blends, designated A, B, and C herein, were prepared using prepolymer P-1 and curing agents SC-1, SC-2 and SC-3. More particularly three 100-part portions of prepolymer P-1 were blended with 6.3 parts of SC-1, 5.6 parts of SC-2 and 10.1 parts of SC-3, respectively. The blends were degassed and then extruded through an orifice 0.035 inch in diameter into an aqueous surface set bath at 90° F. The set bath comprised an aqueous solution containing 2.5% ethylene diamine and 0.5% of the wetting agent Triton X-100. The fast curing agent, ethylene diamine, rapidly formed a protective layer on the outside of the extruded filaments. The filaments were maintained in the surface set bath for 30 seconds after extrusion, then transferred to an oven wherein they were cured for 15 minutes at 300° F. Thereafter they were cured for an additional period of 24 hours at 212° F.

The physical properties of the resulting thread are given in Table I below.

*Table I*

| Blend No. | A | B | C |
| --- | --- | --- | --- |
| Tensile | 2,400 | 642 | 870 |
| Elongation | 330 | 730 | 640 |
| Modulus: | | | |
| 100% | 320 | 70 | 90 |
| 200% | 560 | 70 | 110 |
| 300% | 1,280 | 107 | 155 |
| Permanent Set | 0.0 | 4.6 | 0.0 |
| Tension Set | 0.0 | 12.6 | 0.0 |

EXAMPLE 2

Three blends designated A, B, and C were prepared by mixing 100 parts of prepolymer P-2 with each of three slow curing agents as follows: 7.5 parts SC-2, 13.4 parts SC-3, and 11.1 parts SC-4. The molar ratio of isocyanate groups to active hydrogen in the resulting blends was about 1.15:1.0. The blends were degassed, extruded and cured as described in Example 1. The properties of the resulting threads were as follows:

*Table II*

| Blend No. | A | B | C |
| --- | --- | --- | --- |
| Tensile | 910 | 310 | 80 |
| Elongation | 350 | 300 | 340 |
| Modulus: | | | |
| 100% | 280 | 110 | 25 |
| 200% | 350 | 180 | 45 |
| 300% | 560 | 310 | 80 |
| Permanent Set | 3.1 | Broke | |
| Tension Set | 0.0 | 0.0 | |

EXAMPLE 3

Five blends designated A to E were prepared by mixing 100-part portions of prepolymer P-1 with varying amounts of slow-curing agent SC-5 to obtain varying ratios of isocyanate to active hydrogen as follows:

Blend A—4.0 parts SC-5, NCO/OH ratio 0.85
Blend B—1.0 part SC-5, NCO/OH ratio 1.0
Blend C—3.0 parts SC-5, NCO/OH ratio 1.05
Blend D—2.7 parts SC-5, NCO/OH ratio 1.3
Blend E—2.4 parts SC-5, NCO/OH ratio 1.45

These five blends were degassed, extruded and cured in the manner described in Example 1. The resulting threads had the following properties:

*Table III*

| Blend No. | A | B | C | D | E |
| --- | --- | --- | --- | --- | --- |
| Tensile | 6,000 | 3,700 | 1,070 | 3,600 | 5,800 |
| Elongation | 440 | 420 | 320 | 410 | 430 |
| Modulus: | | | | | |
| 100% | 350 | 330 | 268 | 465 | 635 |
| 200% | 590 | 535 | 535 | 665 | 1,000 |
| 300% | 820 | 800 | 805 | 1,060 | 1,640 |
| Permanent Set | 0.0 | 1.5 | 0.0 | 0.0 | 0.0 |
| Tension Set | 0.0 | 0.0 | 0.0 | 0.0 | 0.0 |

EXAMPLE 4

Three blends designated A, B and C were prepared by mixing 100-part portions of prepolymer P-2 with varying amounts of slow curing agent SC-5 as follows:

Blend A—4.0 parts SC-5, NCO/OH ratio 1.15
Blend B—3.6 parts SC-5, NCO/OH ratio 1.3
Blend C—3.2 parts SC-5, NCO/OH ratio 1.45

These three blends were degassed, extruded and cured in accordance with the procedure of Example 1. The properties of the resulting threads were as follows:

*Table IV*

| Blend No | A | B | C |
|---|---|---|---|
| Tensile | 2,940 | 3,120 | 1,740 |
| Elongation | 310 | 310 | 310 |
| Modulus: | | | |
| 100% | 410 | 400 | 192 |
| 200% | 765 | 665 | 480 |
| 300% | 3,120 | 2,000 | 1,540 |
| Permanent Set | Broke | Broke | 0.0 |
| Tension Set | 0.0 | 0.0 | 0.0 |

EXAMPLE 5

This example illustrates the effect of variations in set bath temperature on thread properties. Four blends designated A to D were prepared by mixing 100-part portions of prepolymer P-1 with 3 parts of slow curing agent SC-5 to yield mixtures having a ratio of equivalents of isocyanate to active hydrogen of 1.15:1.0. These four mixtures were extruded and cured as in Example 1 except that the set bath temperatures employed were as indicated in the table. The resulting thread properties are tabulated in Table V.

*Table V*

| Blend No | A | B | C | D |
|---|---|---|---|---|
| Set bath temp., °F | 80 | 120 | 160 | 200 |
| Tensile | 1,720 | 1,070 | 5,500 | 3,500 |
| Elongation | 300 | 320 | 480 | 550 |
| Modulus: | | | | |
| 100% | 710 | 268 | 380 | 200 |
| 200% | 1,100 | 535 | 570 | 330 |
| 300% | 1,720 | 809 | 760 | 400 |
| Permanent Set | 0.0 | 0.0 | 0.0 | 0.0 |
| Tension Set | 1.5 | 1.5 | 1.5 | Broke |

EXAMPLE 6

Four blends designated A to D were made by mixing 100-part portions of prepolymer P-2 with 4.0 parts of curing agent SC-5 and 2.0 parts of powdered silica. These blends had a ratio of equivalents NCO/OH of 1.15:1.0. These blends were extruded and cured as in Example 1, except that the set bath temperature was varied as indicated in Table VI. The properties of the resulting threads were as tabulated.

*Table VI*

| Blend No | A | B | C | D |
|---|---|---|---|---|
| Set bath temp., °F | 80 | 120 | 160 | 260 |
| Tensile | 900 | 2,940 | 1,500 | 300 |
| Elongation | 210 | 310 | 320 | 230 |
| Modulus: | | | | |
| 100% | 400 | 410 | 440 | 150 |
| 200% | 800 | 765 | 740 | 200 |
| 300% | | 2,120 | 1,400 | 270 |
| Permanent Set | Broke | Broke | Broke | 14.4 |
| Tension Set | 3.0 | | | 25.0 |

EXAMPLE 7

This example illustrates the effect of variations in the curing cycle on thread properties. Four blends designated A to D were prepared by mixing 100-part portions of prepolymer P-1 with three parts of the curing agent SC-5 to yield mixtures having a ratio of equivalents NCO/OH of 1.15:1.0. These blends were extruded and cured as in Example 1, except that the curing conditions were varied. More particularly, blends A, B and C were cured at 300° F. for periods of 60, 120, 180 minutes, respectively. Blend D was cured at 300° F. for 15 minutes, then at 212° F. for 72 hours. The properties of the resulting threads were as tabulated.

*Table VII*

| Blend No | A | B | C | D |
|---|---|---|---|---|
| Curing Conditions: | | | | |
| Temp., 1st interval, °F | 300 | 300 | 300 | 300 |
| Time, 1st interval, min | 60 | 120 | 180 | 15 |
| Temp., 2nd interval, °F | | | | 212 |
| Time, 2nd interval, hrs | | | | 72 |
| Tensile | 457 | 3,800 | 3,400 | 1,400 |
| Elongation | 260 | 500 | 570 | 410 |
| Modulus: | | | | |
| 100% | 230 | 340 | 270 | 300 |
| 200% | 325 | 500 | 385 | 465 |
| 300% | | 720 | 540 | 670 |
| Permanent Set | 0.0 | Broke | 0.0 | 1.5 |
| Tension Set | 1.5 | 1.5 | 1.5 | 3.1 |

EXAMPLE 8

Two blends designated A and B were prepared by mixing 100-part portions of prepolymers P-3 and P-4 with 3.9 parts and 2.9 parts of curing agent SC-5, respectively. These blends were extruded and cured as in Example 1. The resulting threads had the following properties:

*Table VIII*

| Blend No | A | B |
|---|---|---|
| Tensile | 764 | 1,880 |
| Elongation | 310 | 400 |
| Modulus: | | |
| 100% | 254 | 280 |
| 200% | 382 | 400 |
| 300% | 700 | 600 |
| Tension Set | 3.0 | 1.5 |

From the foregoing examples and description it should be apparent that the present process greatly increases the range of thread properties that can be achieved with any given prepolymer. By using a set bath containing a fast-reacting curing agent, the thread upon extrusion is within a very short period of time provided with a protective casing or covering, thus making it unnecessary to achieve a rapid curing rate in the main body of the thread within the protective casing. This permits a wide variation in the type of curing agent that can be used for this main body portion of the thread. Hence the use of a combination of slow and fast acting curing agents in the manner disclosed herein provides an important practical advantage in the art of making urethane threads.

It is of course to be understood that the foregoing examples are intended to be illustrative only and that numerous changes can be made in the ingredients, proportions and conditions set forth. In general where single reactants have been indicated in the examples, mixtures of the same class of reactant can be used. For example, in preparing the polyester type prepolymers, mixtures of two or more glycols, two or more acids, and two or more polyisocyanates can be used. Also mixtures of two or more species of slow curing agent and two or more species of fast curing agent can be employed. Other modifications within the scope of the invention will be apparent to those skilled in the art.

We claim:

1. A method of making urethane thread which comprises mixing a thread-making urethane prepolymer with a slow-reacting urethane curing agent, extruding said mixture in filamentary form into an aqueous bath having a fast-reacting urethane curing agent dissolved therein to produce a thread having a cured surface layer and an incompletely cured core, removing said thread from said bath and heating said thread at an elevated temperature to complete the curing thereof.

2. A method of making urethane thread which comprises mixing a thread-making urethane prepolymer with a slow-reacting urethane curing agent, extruding said mixture in filamentary form into an aqueous bath having a fast-reacting urethane curing agent dissolved therein, causing said fast-reacting curing agent to react with said mixture to form a thread having a solid elastomeric surface layer and an incompletely cured fluid core, removing said thread from said bath and heating said thread at an elevated temperature to complete the curing thereof.

3. A method of making urethane thread which comprises mixing a thread-making urethane prepolymer with a slow-reacting urethane curing agent, extruding said mixture in filamentary form into an aqueous bath having a fast-reacting curing agent dissolved therein, maintaining said bath at a temperature of 80° to 200° F. to cause said fast-reacting curing agent to react with said mixture to form a thread having a solid elastomeric surface layer and an incompletely cured fluid core, removing said thread from said bath and heating said thread at an elevated temperature to complete the curing thereof.

4. A method according to claim 3 and wherein said thread, after removal from said bath, is heated to a temperature of 250° to 350° F. to complete the curing thereof.

5. A method of making urethane thread which comprises mixing a thread-making urethane prepolymer with a slow-reacting urethane curing agent, extruding said mixture in filamentary form into an aqueous bath having a fast-reacting urethane curing agent dissolved therein, the temperature of said bath being from 80° to 200° F., keeping said filamentary mixture in said bath for a period of up to 60 seconds to cause said fast-reacting curing agent to react with said mixture to form a thread having a solid elastomeric surface layer and an incompletely cured fluid core, removing said thread from said bath and heating said thread at a temperature of 250° to 350° F. for a period of 1 to 3 hours to complete the curing thereof.

6. A method according to claim 5 and wherein said slow-reacting curing agent is trimethylolpropane.

7. A method according to claim 5 and wherein said slow-reacting curing agent is triisopropanolamine.

8. A method according to claim 5 and wherein said slow-reacting curing agent is N,N,N',N'-tetrakis(2-hydroxypropyl) ethylene diamine.

9. A method according to claim 5 and wherein said fast-reacting curing agent is an aliphatic diprimary amine.

10. A method according to claim 5 and wherein said fast-reacting curing agent is ethylenediamine.

11. A method according to claim 5 and wherein said fast-reacting curing agent is propylenediamine.

12. A method according to claim 5 and wherein said fast-reacting curing agent is hexamethylenediamine.

References Cited by the Examiner

UNITED STATES PATENTS

| | | | |
|---|---|---|---|
| 2,955,907 | 10/60 | Kolb | 264—184 |
| 2,961,290 | 11/60 | Kolb | 264—184 |
| 3,036,878 | 5/62 | Polansky | 264—178 |
| 3,111,369 | 11/63 | Gregg et al. | 264—184 |
| 3,115,384 | 12/63 | Cacella et al. | 264—184 |

FOREIGN PATENTS

| | | |
|---|---|---|
| 873,665 | 7/61 | Great Britain. |

ALEXANDER H. BRODMERKEL, *Primary Examiner.*

UNITED STATES PATENT OFFICE
CERTIFICATE OF CORRECTION

Patent No. 3,198,863                                        August 3, 1965

Robert E. Lauer et al.

It is hereby certified that error appears in the above numbered patent requiring correction and that the said Letters Patent should read as corrected below.

Column 4, line 19, after "diprimary" insert -- amines --; line 24, for "extruding" read -- extruded --; column 5, lines 31 and 46, for "ration", each occurrence, read -- ratio --.

Signed and sealed this 15th day of February 1966.

(SEAL)
Attest:

ERNEST W. SWIDER
Attesting Officer

EDWARD J. BRENNER
Commissioner of Patents